United States Patent [19]

Sakamoto

[11] 4,341,151
[45] Jul. 27, 1982

[54] ELECTRIC FAN

[75] Inventor: Kunji Sakamoto, Hirakata, Japan

[73] Assignee: Matsushita Seiko Co., Ltd., Osaka, Japan

[21] Appl. No.: 164,954

[22] Filed: Jul. 1, 1980

[30] Foreign Application Priority Data

Dec. 11, 1979 [JP] Japan .................................. 54-161096

[51] Int. Cl.³ .............................................. F24F 7/00
[52] U.S. Cl. .................................. 98/94 R; 98/40 V;
    248/518; 248/166; 416/247 R; 417/234
[58] Field of Search .................. 98/33 A, 40 E, 40 V,
    98/94 R, 99.6, 99.8, 121 A; 248/166, 168, 518,
    676, 282; 415/68, 143, 210; 416/247 R;
    417/234; D23/155

[56] References Cited

U.S. PATENT DOCUMENTS

| | | | |
|---|---|---|---|
| 2,123,448 | 7/1938 | Weber | 416/247 X |
| 2,633,293 | 3/1953 | Jones | 98/94 X |
| 2,644,660 | 7/1953 | Dudley | 248/282 |
| 2,787,207 | 4/1957 | Moore | 98/94 |
| 2,805,820 | 9/1957 | Evarts | 417/234 X |
| 2,857,095 | 10/1958 | Grav | 98/94 X |
| 2,862,657 | 12/1958 | Copeland et al. | 98/94 X |
| 4,084,491 | 4/1978 | Spotts et al. | 98/121 A |
| 4,123,197 | 10/1978 | Keen et al. | 416/247 R X |

Primary Examiner—Albert J. Makay
Assistant Examiner—Harold Joyce
Attorney, Agent, or Firm—Joseph W. Farley

[57] ABSTRACT

An electric fan comprising a motor to retain and drive vanes, an annular main body to retain the motor and to serve as an air flow passage of the fan, a pair of pivots which are provided on the main body, have their axes on a phantom straight line substantially perpendicular to the axis of rotation of the vanes and are symmetrical with respect to said axis of rotation, and a pair of support plates which are rotatably connected with each other and with the main body by means of the pivots, the support plates being of a shape which surrounds the main body and does not hinder the movement of the main body on the pivots. The fan can serve as a table fan, a circulator, a wall fan or a window fan by selectively changing the relative position between the main body and the support plates.

8 Claims, 9 Drawing Figures

FIG.3
FIG.5
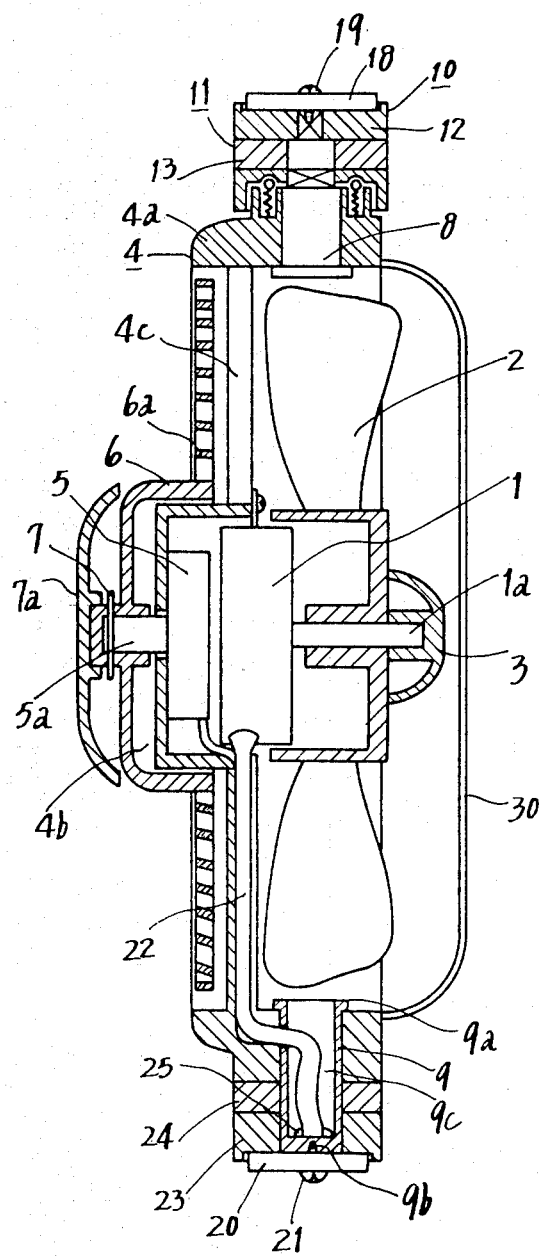
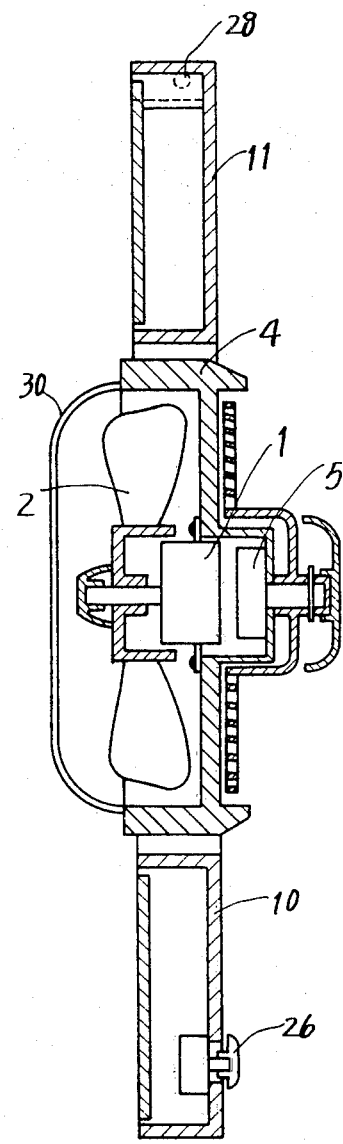

ns, each of which is rotatably connected by said pivots with each other and with the main body, and at the same time has a cutout big enough to allow for rotatory movement of the main body. Each of the support members has a primary contact portion comprising a contact line or at least two contact points on a straight line parallel with said phantom line and a secondary contact portion comprising a contact line or at least one contact point on a straight line passing through at least one end of the pivots and substantially perpendicular to said phantom line.

ELECTRIC FAN

This invention relates to a domestic electric fan, and more particularly to a fan capable of multi-purpose use.

Conventionally, domestic electric blowers include the so-called table fan, wall fan, circulator for circulating room air, window fan for suction or exhaustion of outside or room air, etc. Since each of these types has different structure and shape depending on its use, each must be purchased separately. Therefore, buying these blowers has been very costly. Furthermore, each occupies a large area in a room, consequently reducing living space.

The object of this invention, in the light of the above problems, is to provide a fan which fulfills all the functions of aforementioned blowers and is easy to operate.

In order to achieve this object, the invention provides a fan comprising a main body having vanes and a motor; a pair of pivots which are provided on the main body, have their axis on a phantom straight line substantially perpendicular to the axis of rotation of the vanes, and are symmetrical with respect to said axis of rotation; and a pair of support members each of which is rotatably connected by said pivots with each other and with the main body, and at the same time has a cutout big enough to allow for rotatory movement of the main body. Each of the support members has a primary contact portion comprising a contact line or at least two contact points on a straight line parallel with said phantom line and a secondary contact portion comprising a contact line or at least one contact point on a straight line passing through at least one end of the pivots and substantially perpendicular to said phantom line.

According to this invention, a fan can perform all the functions of a table fan, a wall fan, a circulator and a window fan by rotatably positioning the main body and the support members depending on requirements. Moreover, the fan is easy to operate and requires no additional separate components. It can be packed in a small size by folding the pair of support members in half (one on the other), thereby contributing to a reduction of distribution cost. Thus the invention has a great industrial value.

According to a preferred embodiment, stop-and-rotate means is interposed between the main body and support members so as to determine the relative rotatory positions of the main body and support members. With this means, spontaneous rotation of the main body due to vibration can be prevented.

Desirably, a louver for deflecting air flow to a specific direction is rotatably installed downstream of and across the air flow passage formed by the main body and means to rotate the louver is also provided.

Other features and effects of this invention will be understood through the description of the following preferred embodiment with reference to the accompanying drawings, in which:

FIG. 3 is a sectional view taken on the line III—III of FIG. 2;

FIG. 5 is a sectional view taken on the line V—V of FIG. 9;

Figure 1:
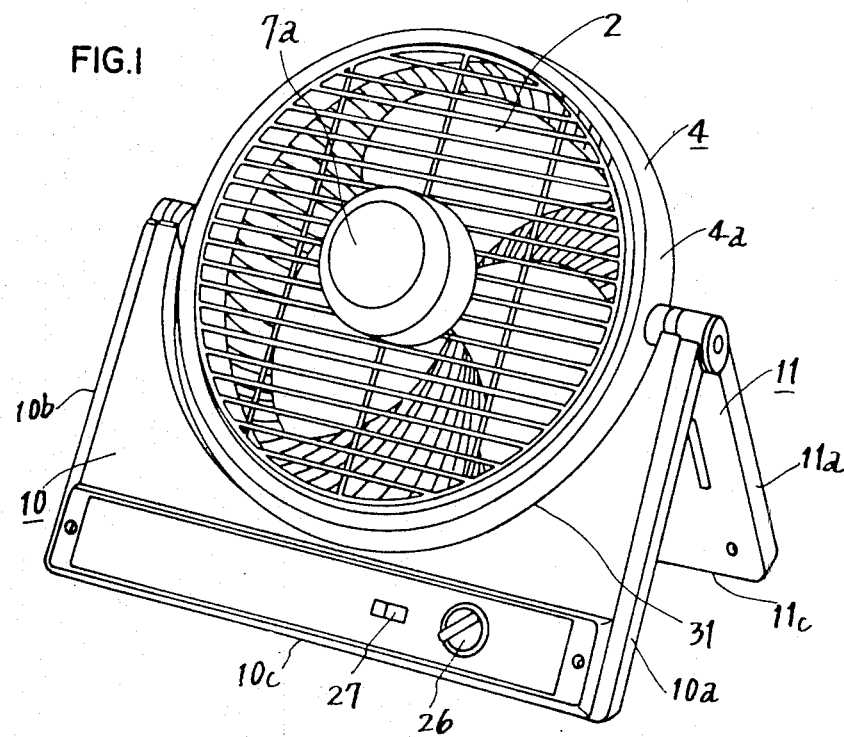
FIG. 1 is a perspective view of an electric fan according to an embodiment of the invention, showing its use as a table fan.
Figure 2:
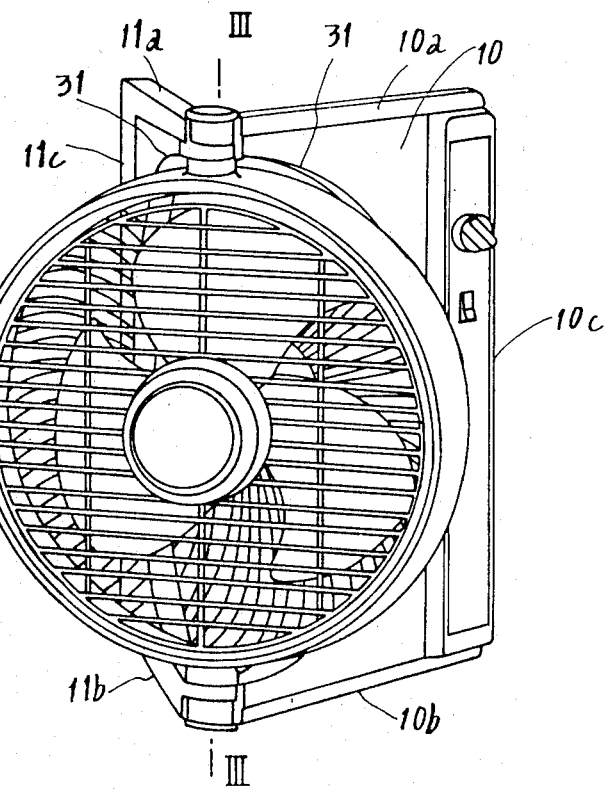
FIG. 2 is a perspective view of the same fan in a different arrangement.

In the drawings, particularly FIGS. 1–3, 1 designates a motor; 2 represents vanes mounted on a rotary shaft 1a; 3 designates a hub for fixing the vanes 2 to the rotary shaft 1a; 4 designates a main body supporting the motor 1, said main body comprising an annular portion 4a forming an air flow passage, a support portion 4b to hold the motor 1, and a connecting portion 4c which connects the support portion 4b to the annular portion 4a and has a construction not to hinder air flow. 5 designates a louver motor arranged coaxially with the axis of rotation of the motor 1 and fixed to the support portion 4b of the main body 4. 6 designates a louver which is provided on the leeward side of the vanes 2 and across the air flow passage formed by the annular portion 4a of the main body 4 so as to change the direction of air flow delivered by the vanes 2, and which is mounted on the rotary shaft 5a of the louver motor 5. The louver 6 has a plurality of deflection plates 6a, which are arranged to gradually increase in an angle of inclination with respect to the axis of the motor 1 from one end to the other, thereby deflecting air flow toward said other end. Therefore, air flow can be sent in a wide range of directions by rotating the louver 6 by means of the louver motor 5.

7 designates a pin for fixing the louver 6 to the rotary shaft 5a of the louver motor 5, and 7a designates a face plate to hide the pin. 8 designates a pivot provided on the main body 4, said pivot having its axis on a phantom straight line meeting the rotary shaft of the motor 1 at substantially right angles, and in this embodiment, being rotatably connected to the main body 4. 9 designates a pivot having its axis on the same phantom line passing through the axis of the pivot 8 and connected rotatably to the main body 4. The pivots 8 and 9 are substantially symmetrical with respect to the motor 1.

A support plate 10 of generally rectangular shape is connected to the pivots 8, 9 at the ends of one of its long sides. Said support plate 10 has a substantially semicircular cutout 31, the radius of which is slightly larger than that of the main body 4, so that it can rotate relative to the main body 4 on the pivots 8, 9 as a center of rotation. A second support plate 11, of about the same shape as the support plate 10, is similarly connected to the pivots 8, 9 at the ends of one long side and is rotatable relative to the main body and to the support plate 10.

Each of the support plates 10, 11 has a contact portion comprising a contact line or at least one contact point on a straight line which passes through either end of the pivots 8, 9 and is substantially perpendicular to aforementioned phantom straight line. In the drawings, FIGS. 1 and 2, the support plates have contact portions 10a, 10b, 11a, 11b, each corresponding to a short side of a rectangle. Therefore, when the two support plates are opened at the angle of 180°, the contact portions 10a and 11a, substantially form a straight line, as also do the contact portions 10b and 11b. Moreover, each of the support plates has another contact portion comprising a contact line, or at least two contact points on a line, substantially parallel with the aforementioned phantom straight line passing through the pivots 8, 9; i.e. in the drawings contact portions 10c and 11c, each corresponding to a long side of a rectangle.

Figure 4:
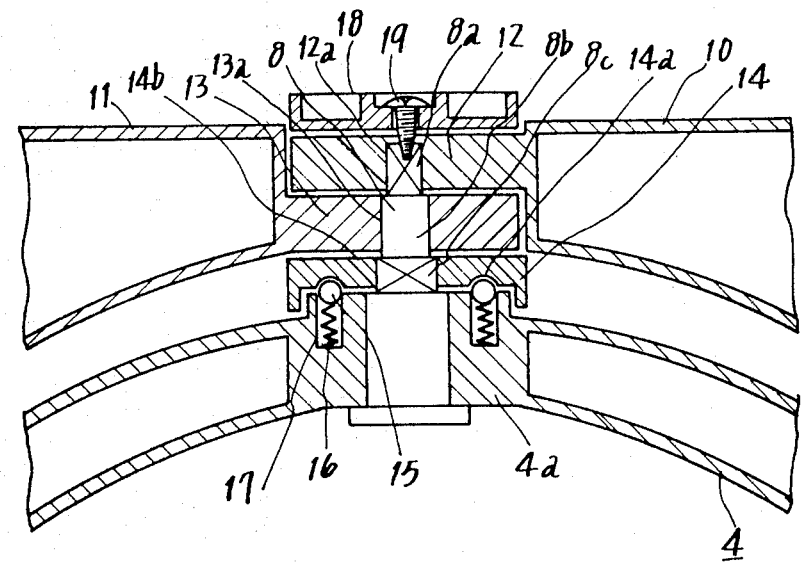
FIG. 4 is an enlarged sectional view of the principal portion of a pivot.

Next is a detailed description of the construction adjacent to the pivots 8, 9. Referring to FIG. 4, 12 designates a pivot support portion of the support plate 10 having a square bore 12a joined together with a square portion 8a of the pivot 8 to prevent mutual rotatory movement. A pivot support portion 13 of the support plate 11, comprising a round bore 13a, is joined with a round portion 8b of the pivot 8. The support plate 11 and the pivot 8 are mutually rotatable. Indicated at 14 is a stop-and-rotate plate comprising recesses 14a into which balls 15 are partially fitted and having a square bore joined with a square portion 8c of the pivot 8. The stop-and-rotate plate and the pivot 8 are not mutually rotatable. Springs 16 bias the balls 15 in the direction toward the stop-and-rotate plate 14. 17 represents accomodation holes provided in the main body 4 to accomodate the springs 16 and to keep the movement of the balls 15 only in said direction. Thus, stop-and-rotate means is made up of the stop-and-rotate plate 14, the balls 15 and the springs 16. 18 designates a dressing washer and 19 designates a screw driven into the end portion of the pivot 8.

The pivot 8 becomes smaller in diameter step by step toward the top end so that it is easily inserted through from the main body 4 side and tightened by using the screw 19 and the washer 18 to form the pivot support.

On the other hand, the pivot 9, as shown in FIG. 3, is provided at one end thereof with an annular projection 9a engaging the main body 4, at the other end with a threaded hole 9b for a screw 21 extending through a dressing washer 20, and with a hollow space 9c through which a lead wire 22 is passed. 23 designates a pivot support portion of the support plate 10, and 24 a corresponding portion of the support plate 11 for engaging the pivot 9. The hollow space 9c of the pivot 9 communicates with the interior of the support plate 10 through a bore 25 in the pivot support portion 23, and guides a lead wire 22 of the motor 1 and louver motor 5 mounted in the main body 4 to the interior of the plate 10. In FIGS. 1 and 5, 26 designates a rotary switch provided on the support plate 10 for controlling the motor 1, and 27 a switch for turning on or off the louver motor 5. These electric control components are connected with the lead wire 22 guided into the interior of the plate 10.

Figure 6:
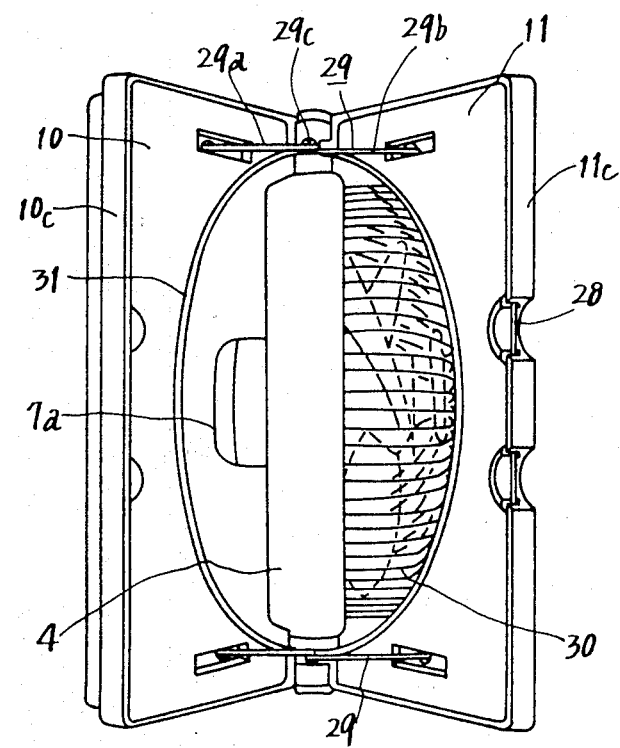
FIG. 6 is a rear view of the fan.

An engagement portion 28 (FIGS. 6 and 9) is provided adjacent to the contact portion 11c of the support plate 11 for suspending the fan from a hook placed on a wall or the like. 29 designates a fixing device to define an angle between the support plates 10 and 11 of about 60°, the fixing device comprising props 29a, 29b connected rotatably onto the rear surfaces of the support plates 10, 11 respectively and connected together at free ends also rotatably by a screw 29c.

A guard 30 (FIG. 3) is provided on the annular portion 4a of the main body 4 to protect the vanes 2.

With the above construction, the fan, when used as a table fan, is placed on a table with the contact portions 10a, 11b of the support plates 10, 11 touching the table as shown in FIG. 2. Air current is almost horizontal near the center of the fan and, by rotating the louver 6, is directable in a wide range. When a complete shift in the direction of the air current is desired, it can be accomplished by merely turning the main body 4 on the pivots while keeping the support plates 10, 11 in the same position, since the main body, by means of the stop-and-rotate plate 14 and the biasing of the balls 15, can be turned and set stationary at specified angular intervals. In this way, the spontaneous rotation of the main body 4 due to the vibration of the motor 1 can be avoided.

Figure 7:
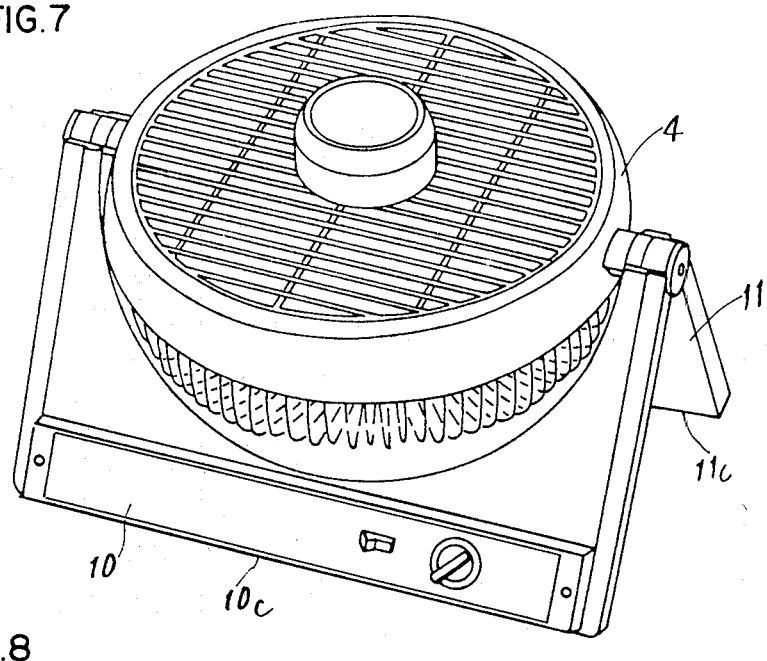
FIG. 7 is a perspective view of the fan used as a circulator.
Figure 8:
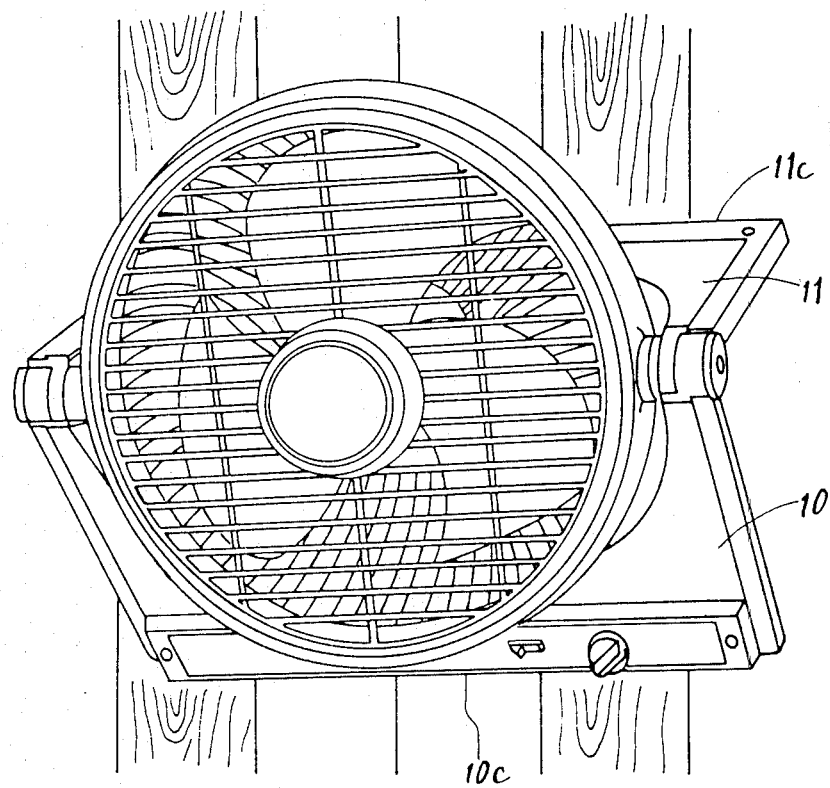
FIG. 8 is a perspective view of the fan used as a wall fan.

When an upwardly or downwardly slanted air current is desired, this can be accomplished by changing the relative position of the main body 4 and the support plates 10, 11 after arranging the fan on the table with the contact portions 10c, 11c of the support plates 10, 11 contacting the table surface, as shown in FIG. 1. With this posture, if the main body 4 is placed substantially horizontal as shown in FIG. 7, the fan serves as a circulator for circulating cold or warm air in a room and rendering the temperature uniform. Generally, conventional fans cannot deliver such a vertical air current. Therefore, the advantages of the fan in this embodiment are apparent. Furthermore, the fan can be used as a wall fan if installed on a wall as shown in FIG. 8, with only the contact portions 10c, 11c touching thereon and with the engagement portion 28 of said contact portion 11 being connected to hooks (not shown) provided on the wall. In installing the fan as above, the fixing device 29 must be so set as to keep the plates 10 and 11 at a specified angle.

Figure 9:
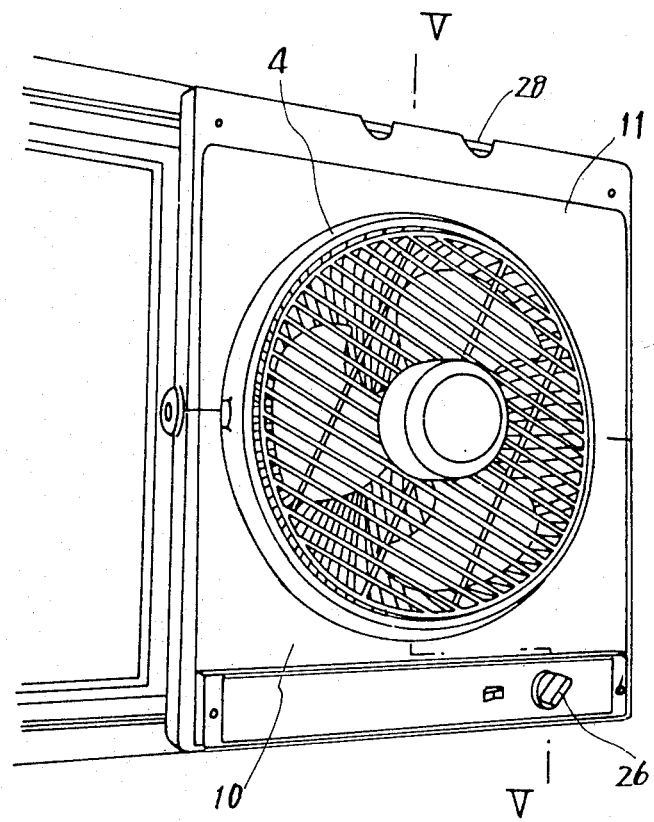
FIG. 9 is a perspective view of the fan used as a window fan.

Furthermore, the fan proves to be the most attractive when used as a window fan. As shown in FIG. 9, the fan becomes a panel construction when it is made flat by taking out the screw 29c of the fixing device 29 and thereafter opening the support plates 10 and 11 at 180°. Accordingly, if a draft passage having a size equal to the panel formed by the support plates 10, 11 is provided in the window, a window fan is prepared by merely hitching the engagement portion 28 of the support plate 11 to hooks (not shown) provided on the window frame. In this case, rotating the louver 6 allows outside air to be taken in in a wide range and properly stopping the louver 6 allows this air to be guided in a desired direction. Furthermore, the fan does not require reversing the rotation of the motor 1 in order to expel the room air but merely requires turning over the main body 4 in a 180-degree arc.

The fan of this invention also has a remarkable feature in terms of packaging. If the support plates 10, 11 are folded in half, the fan becomes thin and small with an overall size of one support plate plus a semicircle equivalent to a half of the main body, thereby providing easy packing and high portability.

What is claimed is:
1. An electric fan comprising:
vanes for sending air axially thereof;
a motor for retaining and turning the vanes;
an annular main body supporting the motor and forming a passage for air flow delivered by the vanes;
a pair of pivots provided on the main body, said pivots being arranged on a phantom straight line substantially perpendicular to the rotary axis of the vanes and symmetrical with respect to the rotary axis; and,
a pair of substantially rectangular plate-like support members which are rotatably connected with each other in side-by-side relation and with the main body by the pivots, each of said support members having a substantially semicircular cutout formed on a radius slightly larger than that of the outer periphery of the main body to allow rotation of the main body and the support members on the pivots, each of said support members being provided with a primary support portion comprising at least two support points on a line parallel with said phantom straight line and with a secondary support portion comprising at least one support point on a line which passes through one end of the axis of the pivots and is substantially perpendicular to said phantom straight line.

2. An electric fan according to claim 1, wherein the main body comprises a support portion to retain the motor, an annular portion to retain the pivots and a connecting portion to connect the annular portion and the support portion.

3. An electric fan according to claim 2, wherein the main body is provided with a louver which is arranged across the air flow passage formed by the annular portion of the main body and means for rotatably mounting the louver on the axis of the main body whereby the direction of air flow can be changed by rotating the louver.

4. An electric fan according to claim 3, wherein the means for rotatably mounting the louver includes a louver motor having a shaft to which the louver is connected.

5. An electric fan according to claim 1, wherein one of the pivots is provided with a stop-and-rotate plate which rotates integrally with one of the support members and which is arranged to face a portion of the main body, balls interposed between the stop-and-rotate plate and said facing portion of the main body, the stop-and-rotate plate having recesses into which the balls are biased, and said facing portion of the main body having holes for the accomodation of springs biasing the balls toward the recesses.

6. An electric fan according to claim 1, wherein one of the pivots has a hollow space and a bore through which said hollow space communicates with the interior of one of the support members, a lead wire of the motor extending through the hollow space and the bore for connection with an electric control component provided on the one support member.

7. An electric fan according to claim 1, wherein one of the support members is provided with an engagement portion to be hitched onto a hook on a wall or the like.

8. An electric fan according to claim 1, wherein the support members are provided with a fixing device to define an opening angle between the support members.

* * * * *